United States Patent [19]

Habeshian

[11] 4,307,894
[45] Dec. 29, 1981

[54] BOAT TRAILER CONTROL

[76] Inventor: Jack J. Habeshian, 1 Villa La., Smithtown, N.Y. 11787

[21] Appl. No.: 113,115

[22] Filed: Jan. 17, 1980

[51] Int. Cl.³ .............................................. B60P 3/10
[52] U.S. Cl. ................................... 280/476 R; 9/1.2
[58] Field of Search ........... 9/1.2; 280/476 R, 414 R, 280/414 A, 414 B, 656, DIG. 2; 414/462, 500, 538; 244/50, 102 R

[56] References Cited

U.S. PATENT DOCUMENTS

| | | | |
|---|---|---|---|
| 2,920,845 | 1/1960 | Palmiter | 244/50 X |
| 3,084,954 | 4/1963 | Schlueter | 280/476 R |
| 3,189,365 | 6/1965 | Blacher | 280/476 R X |
| 3,755,838 | 9/1973 | Dunagan | 9/1.2 X |
| 3,841,662 | 10/1974 | Howell | 9/1.2 X |
| 4,023,222 | 5/1977 | Selby | 9/1.2 |
| 4,113,041 | 9/1978 | Birkeholm | 244/50 X |
| 4,157,200 | 6/1979 | Johnson | 296/15 |
| 4,212,580 | 7/1980 | Fluck | 9/1.2 X |

Primary Examiner—Joseph F. Peters, Jr.
Assistant Examiner—Norman L. Stack, Jr.
Attorney, Agent, or Firm—James P. Malone

[57] ABSTRACT

The invention is a control for boat trailers. A body member is clamped under the forward tongue of a boat type trailer. A folding member is pivotally mounted on the body member. A wheel holding means is rotatably mounted on the folding member. A pair of wheels are mounted on the wheel holding member. A handle is pivotally mounted on the body member. A connecting link member is pivotally connected to the handle at its upper end and pivotally connected to the folding member at its lower end. Provisions are provided so that a removable steering handle may be used on the wheel holding member.

4 Claims, 2 Drawing Figures

U.S. Patent
Dec. 29, 1981
4,307,894
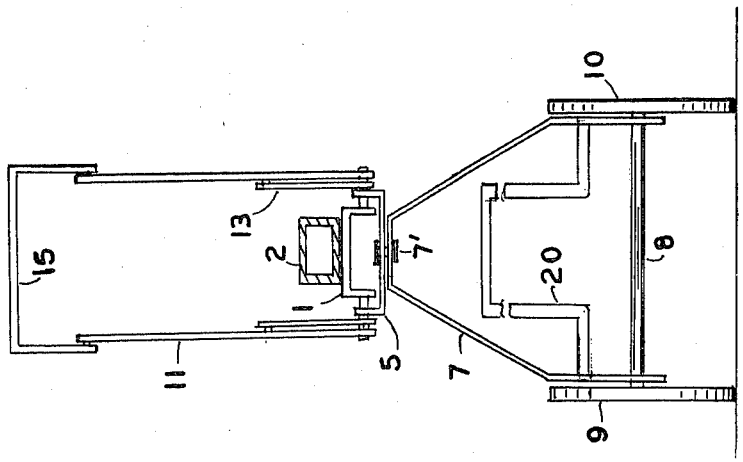
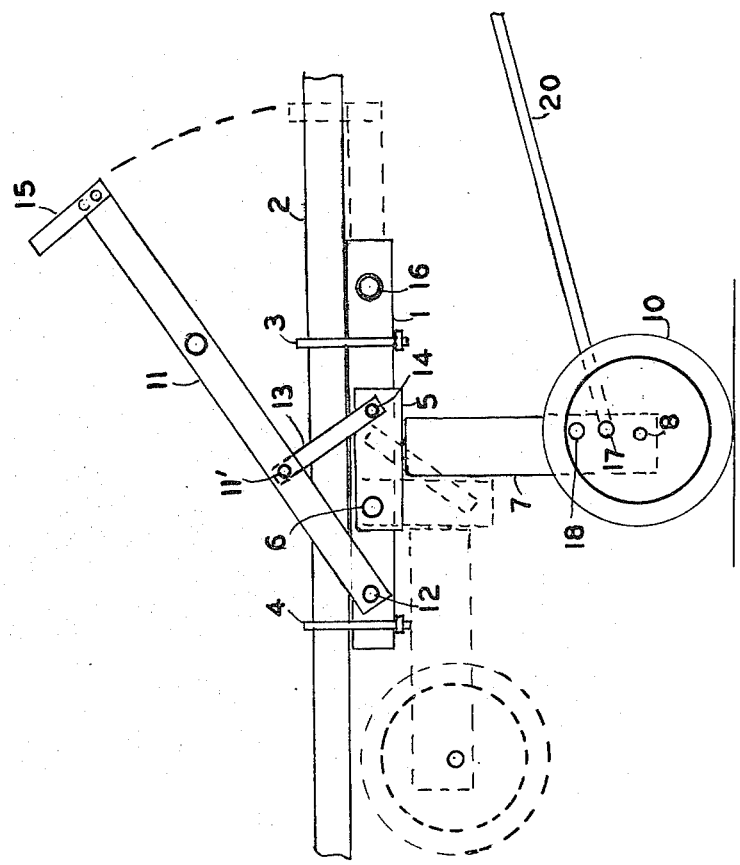

BOAT TRAILER CONTROL

TECHNICAL FIELD

This invention relates to a control for a boat trailer and more particularly for the mounting of wheels on the forward tongue of a boat type trailer.

BACKGROUND ART

Boat trailers are commonly used to transport boats such as outboard motor boats. These trailers have a tongue which connects to the vehicle by means of a ball and socket joint.

There are no wheels under the front tongue of the boat trailer so that when it is disconnected from the vehicle it is difficult to manoeuvre.

Conventional controls for providing a wheel support for the front tongue of the trailer generally comprises single wheel devices which are mounted on a long screw type jack arrangement. It requires a considerable amount of turning of the jack handle to retract the wheel sufficiently when the trailer is being transported by a vehicle.

SUMMARY OF THE INVENTION

The present invention provides a wheel control for boat type trailers which provides two wheels which are locked in position when they are in the wheels down position and which may be easily and quickly folded up under the tongue of the boat trailer when the trailer is being transported by a vehicle. The present invention eases the effort required to place the trailer on or off the vehicle, by the incorporated system of leverage.

Accordingly, a principal object of the invention is to provide a simple system to raise and lower a trailer on and off a vehicle by means of a leverage controlled, pivotal wheel assembly.

Another object of the invention is to provide new and improved wheel controls for boat type trailers.

Another object of the invention is to provide new and improved wheel controls for boat type trailers having a pair of wheels which are locked in wheels down position by the weight of the trailer and which may be easily and quickly folded up into vehicle transport position.

Another object of the invention is to provide a steerable wheel support to be able to move the trailer manually with a removable steering handle.

Another object of the invention is to provide new and improved controls for boat trailers comprising, a body member adapted to be clamped under the forward tongue of a boat type trailer, a folding member pivotally mounted on the body member, wheel holding means rotatably mounted on the folding member, a pair of wheels mounted on the wheel holding member, a handle pivotally mounted on the body member, and a connecting link member pivotally connected to the handle at its upper end and pivotally connected to the folding member at its lower end.

These and other objects of the invention will be apparent from the following specifications and drawing of which:

BRIEF DESCRIPTION OF THE DRAWINGS

FIG. 1 is a side view of an embodiment of the invention in the wheels down position.

FIG. 2 is a front view of FIG. 1.

BEST MODE FOR CARRYING OUT THE INVENTION

Referring to the drawings, the invention comprises a body member 1, which is adapted to be clamped to the forward tongue 2 of a boat type trailer by means of the U shaped clamps 3 and 4. A folding member 5 is pivotally connected to the body member at the point 6. Both the body member 1 and the forward tongue member 2 have U or channel shaped cross-sections as shown in FIG. 2. A wheel holding member 7 is rotatably mounted on to the folding member so that the wheels can be turned to steer the trailer. At the lower end of the wheel holding member 7 is an axle 8 upon which is mounted a pair of wheels 9 and 10. A handle 11 is pivotally mounted on the body member at the point 12. Connecting link members 13,13' are pivotally connected to the handle at the point 11' at its upper end and pivotally connected to the folding member 5 at point 14, at its lower end.

FIG. 1 shows how the axle 8 is mounted forward of the rotatable mounting 7' and the axle point 6 in the wheels down position, so that the weight of the trailer will exert a force which will lock the wheels in a wheel down position and prevent inadvertent retraction of the wheels.

When is it desired to connect the trailer to a vehicle, with one hand gripping the hand hold 15, at the upper end of the handle 11, the safety pin 16 is pulled, the handle 15 is held firmly and pushed down and the trailer beam 2 is easily lowered on to the ball. Then the handle 15 can be pushed in the full down position which causes the wheels to fold up in a detracted position and locked in this position by the inserting pin 16. Which now passes through handle 11 and the body member 1. The wheel holding member 7 is kept from rotating by its close position to the body member in its retracted position. The ball and socket connection is conventional.

When it is desired to remove the trailer from a vehicle the safety lock pin 16 is removed, the wheels come down to touch the ground, the handle 11 is now raised the remaining distance and because of the added leverage easily lifts the trailer off the vehicle. The pin 16 is now replaced in its hole and keeps wheel holding member from inadvertant retraction. In this position the boat trailer may be easily manoeuvred manually. The wheel holding member 7 preferably has several additional axle mounting holes 17 and 18 for adjusting the height of the body member 1, as desired. These holes can also be used for mounting another handle 20, if desired. This handle provides easy steering when manually pulling the trailer. The handle is mounted so as to provide leverage to minimize the force required to lift the trailer.

It is claimed:

1. Control wheel means for boat trailer comprising:
   a body member having a U shaped cross-section adapted to be fastened under the forward tongue of a boat type trailer,
   a folding member having a U shaped cross-section pivotally mounted on the body member,
   a forked wheel holding means rotatably mounted on the folding member,
   a pair of wheels mounted on the wheel holding member,
   a handle lever pivotally mounted on the body member, and a connecting link member pivotally connected to the handle lever at its upper end and pivotally connected to the folding member at its lower end, whereby when the handle is lifted, the wheels are rotated down into contact with the ground for manual handling, and when the handle is lowered the wheels are rotated up out of contact with the ground for vehicle towing.

2. Apparatus as in claim 1 wherein the wheel holding member has an axle mounting the wheels, the axle being mounted so that it is forward of the rotatable mounting of the folding member when the wheels are in the down position so that the weight of the trailer will lock the wheels from retracting.

3. Apparatus as in claim 1 wherein the body member and folding member are channel shaped.

4. Apparatus as in claim 1 wherein the handle lever is rotatably mounted on the body member at one end of the lever and connected to the folding member near the mounting point so that the manual force moment on the other end of the lever provides a mechanical advantage to provide leverage to minimize the force required to lift the trailer.

* * * * *